(12) United States Patent
Yanagisawa et al.

(10) Patent No.: US 11,372,175 B2
(45) Date of Patent: Jun. 28, 2022

(54) OPTICAL MODULE

(71) Applicant: SHINKO ELECTRIC INDUSTRIES CO., LTD., Nagano (JP)

(72) Inventors: Kenji Yanagisawa, Nagano (JP); Koichi Toya, Nagano (JP)

(73) Assignee: SHINKO ELECTRIC INDUSTRIES CO., LTD., Nagano (JP)

(*) Notice: Subject to any disclaimer, the term of this patent is extended or adjusted under 35 U.S.C. 154(b) by 0 days.

(21) Appl. No.: 16/951,293

(22) Filed: Nov. 18, 2020

(65) Prior Publication Data

US 2021/0173159 A1 Jun. 10, 2021

(30) Foreign Application Priority Data

Dec. 9, 2019 (JP) .............................. JP2019-222297

(51) Int. Cl.
*G02B 6/42* (2006.01)

(52) U.S. Cl.
CPC ......... *G02B 6/4239* (2013.01); *G02B 6/4212* (2013.01); *G02B 6/4214* (2013.01); *G02B 6/4238* (2013.01); *G02B 6/4245* (2013.01)

(58) Field of Classification Search
None
See application file for complete search history.

(56) References Cited

U.S. PATENT DOCUMENTS

| | | | |
|---|---|---|---|
| 6,438,281 B1 | 8/2002 | Tsukamoto et al. | |
| 9,417,393 B2 | 8/2016 | Yanagisawa | |
| 9,958,607 B2 | 5/2018 | Yanagisawa | |
| 10,022,927 B2 | 7/2018 | Yanagisawa | |
| 2006/0050493 A1* | 3/2006 | Hamasaki | G02B 6/43 361/767 |
| 2016/0313517 A1* | 10/2016 | Yamamoto | G02B 6/138 |
| 2016/0313519 A1* | 10/2016 | Yanagisawa | G02B 6/4244 |
| 2017/0293096 A1* | 10/2017 | Yamamoto | G02B 6/122 |

FOREIGN PATENT DOCUMENTS

| | | |
|---|---|---|
| JP | 2000-347051 | 12/2000 |
| JP | 2015-230481 | 12/2015 |
| JP | 2016-126039 | 7/2016 |
| JP | 2017-102312 | 6/2017 |

* cited by examiner

*Primary Examiner* — Michelle R Connelly
(74) *Attorney, Agent, or Firm* — IPUSA, PLLC

(57) ABSTRACT

An optical module includes a wiring board having a first electrode, an optical waveguide provided on the wiring board, an optical element having a second electrode and provided on the optical waveguide, a conductive bonding material bonding the first and second electrodes, and a fixing member that fixes the optical element to the optical waveguide. The optical waveguide includes a core layer, a first cladding layer provided on a first side of the core layer, a second cladding layer provided on a second side of the core layer opposite to the first side, and an optical path conversion mirror provided on the core layer or the second cladding layer. The optical element is optically coupled to one end of the core layer via the optical path conversion mirror, and a softening point of the fixing member is higher than a melting point of the conductive bonding material.

14 Claims, 11 Drawing Sheets

OPTICAL MODULE

CROSS-REFERENCE TO RELATED APPLICATION

This application is based upon and claims priority to Japanese Patent Application No. 2019-222297, filed on Dec. 9, 2019, the entire contents of which are incorporated herein by reference.

FIELD

Certain aspects of the embodiments discussed herein are related to an optical module, and a method of manufacturing the optical module.

BACKGROUND

An optical module may include an optical waveguide provided on a wiring board, and an optical element provided on the optical waveguide. In this case, electrodes of the optical element are bonded to electrodes of the wiring board, and the optical element is fixed to the wiring board. In such an optical module, an optical signal transmitted from or received by the optical element propagates through the optical waveguide. An underfill resin may be provided between the optical element and the optical waveguide, as described in Japanese Laid-Open Patent Publication No. 2017-102312, for example.

Other examples of the optical module are described in Japanese Laid-Open Patent Publication No. 2016-126039, Japanese Laid-Open Patent Publication No. 2000-347051, and Japanese Laid-Open Patent Publication No. 2015-230481, for example.

In conventional optical modules, loss may occur in the optical signal output from or input to the optical element.

SUMMARY

Accordingly, it is an object in one aspect of the present disclosure to provide an optical module and a method for manufacturing the optical module, which can reduce the loss of the optical signal.

According to one aspect of the present disclosure, an optical module includes a wiring board having a first electrode; an optical waveguide provided on the wiring board; an optical element having a second electrode and provided on the optical waveguide; a first conductive bonding member, made of a first conductive bonding material, and configured to bond the second electrode to the first electrode; and a fixing member configured to fix the optical element to the optical waveguide, wherein the optical waveguide includes a core layer, a first cladding layer provided on a first side of the core layer closer to the wiring board, a second cladding layer provided on a second side of the core layer opposite to the first side, and an optical path conversion mirror provided on the core layer or the second cladding layer, wherein the optical element is optically coupled to one end of the core layer via the optical path conversion mirror, and wherein a softening point of the fixing member is higher than a melting point of the first conductive bonding material.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1:
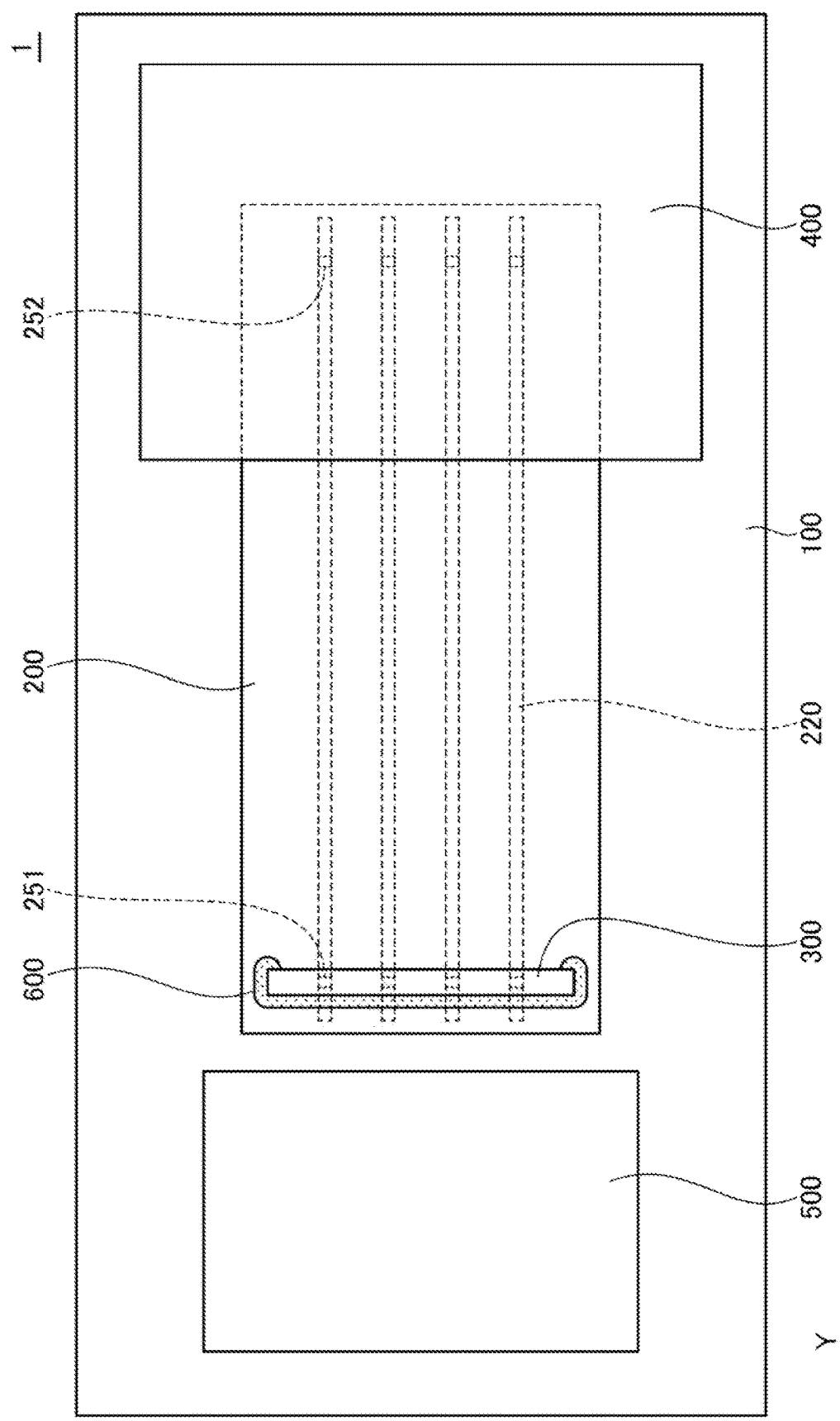
FIG. 1 is a plan view illustrating an outline of an optical module according to one embodiment.

The present inventors diligently studied the cause of the loss that occurs in the optical signal transmitted from or received by the optical element. As a result, it was found that a misalignment (or positional error), conventionally not recognized, may occur between the optical element and the optical waveguide. As described above, the electrodes of the optical element are bonded to the electrodes provided on the wiring board. This bonding of the electrodes can be performed with a high accuracy. Accordingly, immediately after mounting of the optical element, the optical element and the optical waveguide are aligned with a high accuracy. However, after the optical element is mounted, an electronic circuit chip is mounted on the wiring board, and a reflow soldering is performed when mounting the electronic circuit chip. For example, a chip of a driver is mounted in a case where the optical element is a light emitting element, and a chip of a trans-impedance amplifier (TIA) is mounted in a case where the optical element is a light receiving element. For this reason, when mounting the electronic circuit chip, the solder bonding the electrodes of the optical element to the electrodes of the wiring board melts, and a misalignment (or positional error) or tilt of the optical element may occur, to cause a misalignment between the optical element and the optical waveguide. Even if an underfill resin is provided between the optical element and the optical waveguide, such a misalignment (or positional error) cannot be reduced because the underfill resin provided between the optical element and the optical waveguide softens at a low temperature. The misalignment between the optical element and the optical waveguide becomes more conspicuous as the number of channels of the optical element becomes larger.

Based on these new findings, the present inventors studied even more diligently in order to reduce the misalignment that may occur between the optical element and the optical waveguide when mounting the electronic circuit chip. As a result, the present inventors found that the loss of the optical signal can be reduced, by fixing the optical element to the optical waveguide by a fixing member made of a potting resin or the like having predetermined physical properties, such as a fixing member made of a resin, for example, before mounting the electronic circuit chip.

Embodiments of the present invention will be described in detail with reference to the accompanying drawings. In the drawings, those parts that are substantially the same are designated by the same reference numerals, and a repeated description of substantially the same parts may be omitted.

A description will now be given of an optical module, and a method of manufacturing the optical module according to each embodiment of the present invention.

[Structure of Optical Module]

Figure 2:
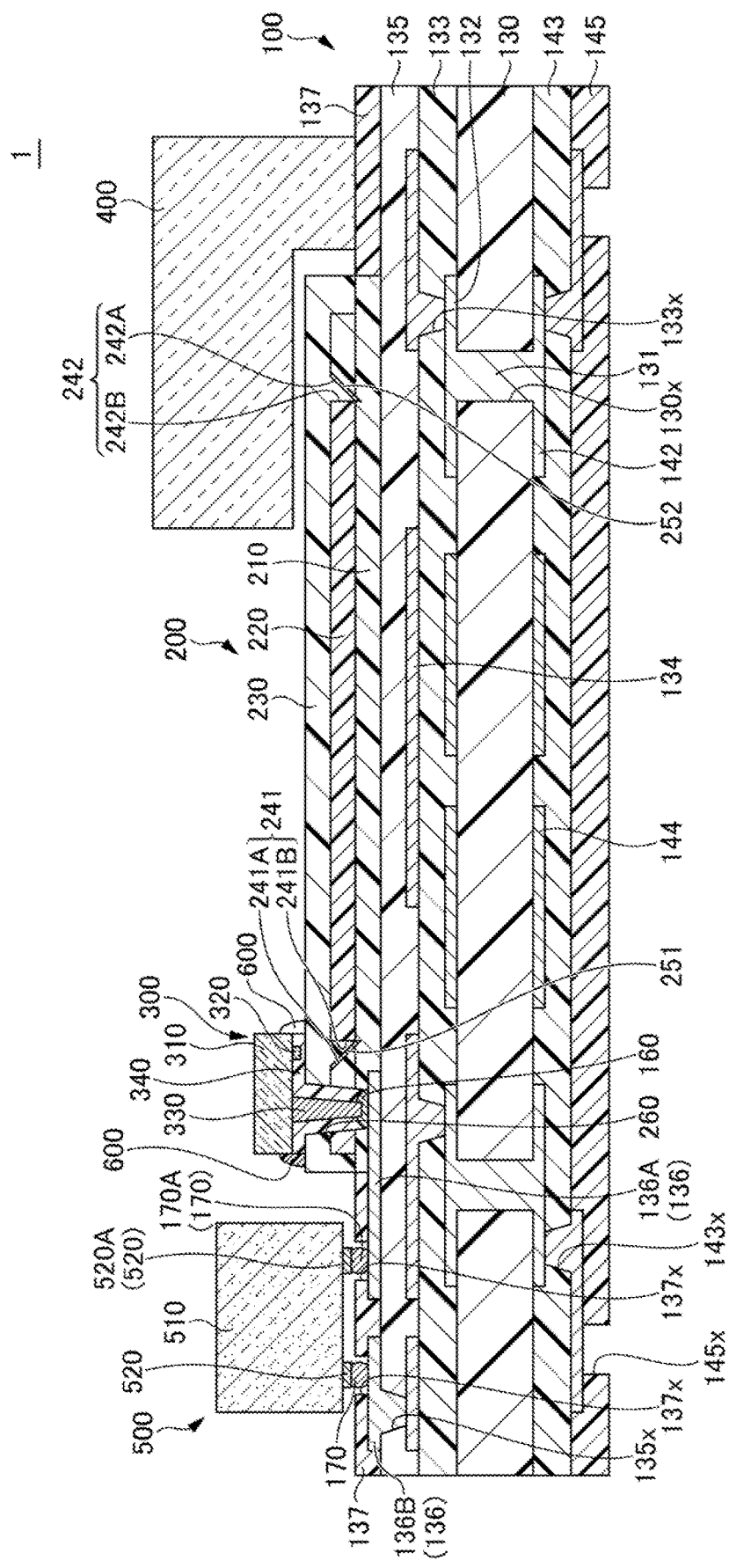
FIG. 2 is a cross sectional view illustrating the optical module according to one embodiment.

First, a structure of the optical module according to one embodiment will be described. FIG. 1 is a plan view illustrating an outline of the optical module according to one embodiment. FIG. 2 is a cross sectional view illustrating the optical module according to one embodiment.

As illustrated in FIG. 1 and FIG. 2, an optical module 1 according to one embodiment includes a wiring board 100, an optical waveguide 200, a light emitting element 300, an optical component 400, an electronic circuit chip 500, and a fixing member 600. The optical waveguide 200, the optical component 400, and the electronic circuit chip 500 are provided on the wiring board 100. The light emitting element 300 is provided on the optical waveguide 200. In the present disclosure, a normal direction to a principal surface of the wiring board 100 is regarded as a Z-axis direction, and two directions perpendicular to each other in a plane perpendicular to the Z-axis direction according to the right-handed system are regarded as an X-axis direction and a Y-axis direction. In addition, an upward direction in FIG. 2, for example, is regarded as a positive Z-axis direction. In the present disclosure, a plan view refers to a view viewed from the Z-axis direction, that is, from a direction perpendicular to the primary surface of the wiring board 100. Further, a planar shape refers to a shape of an element in the plan view of the element. The optical module 1 may be used in an upside down state, or may be arranged at an arbitrary angle.

In the wiring board 100, interconnect layers and insulating layers are laminated on both sides (or upper and lower surfaces in FIG. 2) of a core substrate 130. More particularly, in the wiring board 100, an interconnect layer 132, an insulating layer 133, an interconnect layer 134, an insulating layer 135, an interconnect layer 136, and a solder resist layer 137 are successively laminated on one side (for example, an upper surface) of the core substrate 130. Further, in the wiring board 100, an interconnect layer 142, an insulating layer 143, an interconnect layer 144, and a solder resist layer 145 are successively laminated on the other side (for example, a lower surface) of the core substrate 130.

For example, a so-called glass epoxy substrate or the like made of a glass cloth impregnated with an insulating resin, such as an epoxy resin, for example, may be used for the core substrate 130. A substrate made of a woven fabric or nonwoven fabric, such as glass fibers, carbon fibers, aramid fibers, or the like, impregnated with an epoxy resin, a polyimide resin, or the like, may also be used for the core substrate 130. The core substrate 130 may have a thickness of approximately 60 μm to approximately 400 μm, for example. The core substrate 130 is provided with a through hole 130x that penetrates the core substrate 130 in a thickness direction thereof. The planar shape of the through hole 130x may be a circular shape, for example.

The interconnect layer 132 is formed on the upper surface of the core substrate 130. In addition, the interconnect layer 142 is formed on the lower surface of the core substrate 130. The interconnect layer 132 and the interconnect layer 142 are electrically connected by a via wiring 131 formed inside the through hole 130x. The interconnect layers 132 and 142 are patterned into predetermined planar shapes, respectively. For example, Cu or the like may be used as the material forming each of the interconnect layers 132 and 142, and the via wiring 131. The interconnect layers 132 and 142 may have a thickness of approximately 10 μm to approximately 30 μm, for example. The interconnect layer 132, the interconnect layer 142, and the via wiring 131 may be integrally formed.

The insulating layer 133 is formed on the upper surface of the core substrate 130, so as to cover the interconnect layer 132. For example, an insulating resin or the like having an epoxy resin or a polyimide resin as a main component thereof, may be used as the material forming the insulating layer 133. The insulating layer 133 may have a thickness of approximately 30 μm to approximately 40 μm, for example. The insulating layer 133 may contain a filler, such as silica ($SiO_2$) or the like.

The interconnect layer 134 is famed above the insulating layer 133. The interconnect layer 134 includes a via interconnect filling the inside of a via hole 133x that penetrates the insulating layer 133 to expose an upper surface of the interconnect layer 132, and an interconnect pattern formed on an upper surface of the insulating layer 133. The interconnect layer 134 is electrically connected to the interconnect layer 132. The via hole 133x may be an inverted truncated cone-shaped recess having a first opening that opens at the insulating layer 135, and a second opening that has a bottom surface famed by the upper surface of the interconnect layer 132, where a diameter of the first opening is greater than a diameter of the second opening. The material forming the interconnect layer 134 and the thickness of the interconnect pattern forming the interconnect layer 134, may be similar to those of the interconnect layer 132, for example.

The insulating layer 135 is formed above the upper surface of the insulating layer 133, so as to cover the interconnect layer 134. The material forming the insulating layer 135 and the thickness of the insulating layer 135, may be similar to those of the insulating layer 133, for example. The insulating layer 135 may contain a filler, such as silica or the like.

The interconnect layer 136 is formed above the insulating layer 135. The interconnect layer 136 includes a via interconnect filling the inside of a via hole 135x that penetrates the insulating layer 135 to expose an upper surface of the interconnect layer 134, and interconnect patterns 136A and 136B formed on an upper surface of the insulating layer 135. The interconnect pattern 136A is electrically connected to the light emitting element 300 and the electronic circuit chip 500. The interconnect pattern 136B is insulated from the interconnect pattern 136A, and is electrically connected to the electronic circuit chip 500. The interconnect layer 136 is electrically connected to the interconnect layer 134. The via hole 135x may be an inverted truncated cone-shaped recess having a first opening that opens at the solder resist layer 137, and a second opening that has a bottom surface formed by the upper surface of the interconnect layer 134, where a diameter of the first opening is greater than a diameter of the second opening. The material forming the interconnect layer 136 and the thickness of the interconnect layer 136, may be similar to those of the interconnect layer 134, for example. The interconnect pattern 136A is an example of a first electrode.

The solder resist layer 137 is the outermost layer above the wiring board 100, and is selectively formed above the upper surface of the insulating layer 135, so as to cover the interconnect layer 136. For example, a photosensitive resin or the like, such as an epoxy resin, an acrylic resin, or the like, may be used as the material forming the solder resist layer 137. The thickness of the solder resist layer 137 may be approximately 15 μm to approximately 35 μm, for example.

Figure 3:
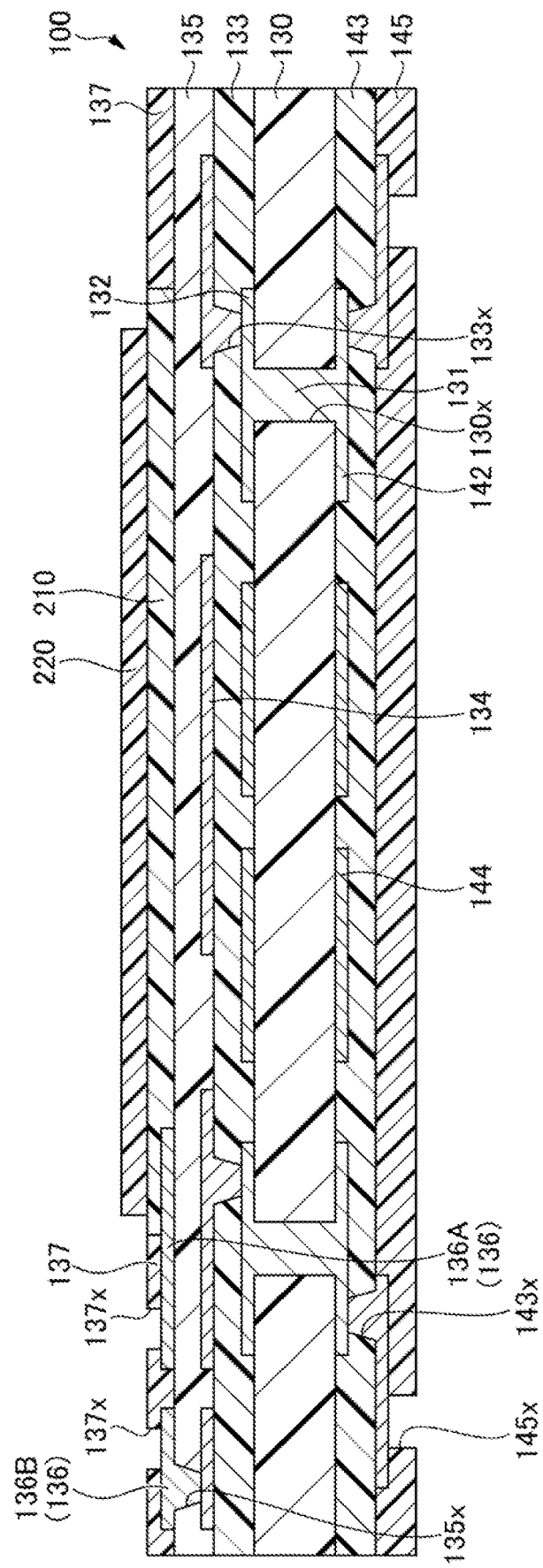
FIG. 3 is a cross sectional view (part 1) illustrating a method of manufacturing the optical module according to one embodiment.

As illustrated in FIG. 3 which will be described later, the solder resist layer 137 has a plurality of openings 137x, and a portion of the upper surface of interconnect layer 136 is exposed at the bottom of each of the openings 137x. For example, the upper surface of the interconnect pattern 136A is exposed at the bottom of the opening 137x. The planar shape of the opening 137x may be a circular shape, for example. A metal film may be formed, or an anti-oxidizing treatment, such as an organic solderability preservative (OSP) treatment or the like, may be performed on the upper surface of the interconnect layer 136 exposed inside the opening 137x, as appropriate. Examples of the metal film include a Au film, a Ni/Au film (that is, a metal film laminate of a Ni film and an Au film laminated in this order), a Ni/Pd/Au film (that is, a metal film laminate of a Ni film, a Pd film, and an Au film laminated in this order), or the like.

A conductive bonding member 170, made of a conductive bonding material, is provided at a plurality of positions on the interconnect layer 136 exposed inside the openings 137x. The plurality of conductive bonding members 170 include a conductive bonding member 170A, made of a conductive bonding material, and provided on the interconnect pattern 136A. The conductive bonding member 170 may be a solder bump, for example. For example, an alloy containing Pb, an alloy of Sn and Cu, an alloy of Sn and Ag, an alloy of Sn, Ag, and Cu, or the like may be used as the material forming the solder bump. The conductive bonding material used for the conductive bonding member 170A is an example of a second conductive bonding material.

The insulating layer 143 is formed below the lower surface of the core substrate 130, so as to cover the interconnect layer 142. The material forming the insulating layer 143 and the thickness of the insulating layer 143, may be similar to those of the insulating layer 133, for example. The insulating layer 143 may contain a filler, such as silica or the like.

The interconnect layer 144 is formed below the insulating layer 143. The interconnect layer 144 includes a via interconnect filling the inside of a via hole 143x that penetrates the insulating layer 143 to expose a lower surface of the interconnect layer 142, and an interconnect pattern formed on a lower surface of the insulating layer 143. The interconnect layer 144 is electrically connected to the interconnect layer 142. The via hole 143x may be an inverted truncated cone-shaped recess having a first opening that opens at the solder resist layer 145, and a second opening that has a bottom surface formed by the lower surface of the interconnect layer 142, where a diameter of the first opening is greater than a diameter of the second opening. The material forming the interconnect layer 144 and the thickness of the interconnect layer 144, may be similar to those of the interconnect layer 132, for example.

The solder resist layer 145 is the outermost layer below the wiring board 100, and is formed below the lower surface of the insulating layer 143, so as to cover the interconnect layer 144. The material forming the solder resist layer 145 and the thickness of the solder resist layer 145, may be similar to those of the solder resist layer 137, for example. As illustrated in FIG. 3 which will be described later, the solder resist layer 145 has a plurality of openings 145x, and a portion of the lower surface of interconnect layer 144 is exposed at the bottom of each of the openings 145x. The planar shape of the opening 145x may be a circular shape, for example. The interconnect layer 144 that is exposed inside the opening 145x may be used as a pad to be electrically connected to a mounting substrate (not illustrated), such as a motherboard or the like. The metal film described above may be formed, or the anti-oxidizing treatment, such as the OSP treatment or the like, may be performed on the lower surface of the interconnect layer 144 exposed inside the opening 145x, as appropriate.

The optical waveguide 200 is foiled above the upper surface of the insulating layer, in a region where the solder resist layer 137 is not formed. The optical waveguide 200 includes a first cladding layer 210, a core layer 220, a second cladding layer 230, and metal films 251 and 252.

The first cladding layer 210 is famed on the upper surface of the insulating layer 135. The material forming the first cladding layer 210 may be a polymer, such as a polyimide resin, an acrylic resin, an epoxy resin, a polyolefin resin, a polynorbornene resin, or the like. The thickness of the first cladding layer 210 may be approximately 10 μm to approximately 30 μm, for example.

The core layer 220 is selectively formed on, that is, provided a predetermined positions on an upper surface of the first cladding layer 210. In the example illustrated in FIG. 1, four elongated core layers 220 extending in the X-direction, are arranged side by side along the Y-direction. However, the number of elongated core layers 220 may be one, two, three, or five or more, for example. The elongated core layers 220 may be arranged side by side at a pitch in a range of approximately 200 μm to approximately 300 μm, for example. The core layer 220 may be formed by a material similar to that forming the first cladding layer 210. The core layer 220 may have a thickness of approximately 15 μm to approximately 35 μm, for example. A cross sectional shape of the core layer 220 along a short direction may be a square shape, for example.

The second cladding layer 230 is formed on the upper surface of the first cladding layer 210, so as to cover a periphery of the core layer 220. The second cladding layer 230 may be formed by a material similar to that forming the first cladding layer 210. The second cladding layer 230 may have a thickness of approximately 10 μm to approximately 30 μm, for example. In the present disclosure, the thickness of the second cladding layer 230 refers to the thickness of a portion of the second cladding layer 230 overlapping the core layer 220 in the plan view, that is, the thickness of the portion of the second cladding layer 230 provided on the core layer 220.

As described above, the first cladding layer 210, the core layer 220, and the second cladding layer 230 may be formed of the same material, but a refractive index of the core layer 220 is higher than refractive indexes of the first cladding layer 210 and the second cladding layer 230. The core layer 220 may include a refractive index control additive, such as Ge or the like, to make the refractive index of the core layer 220 higher than the refractive indexes of the first cladding layer 210 and the second cladding layer 230. The refractive indexes of the first cladding layer 210 and the second cladding layer 230 may be 1.5, for example, and the refractive index of the core layer 220 may be 1.6, for example.

The optical waveguide 200 is formed with grooves 241 and 242 that expose the core layer 220. The groove 241 is formed closer to the opening 137x of the solder resist layer 137 than the groove 242. The grooves 241 and 242 are formed from the upper surface of the core layer 220, and penetrate the core layer 220 to reach an intermediate portion along a thickness direction of the first cladding layer 210, so as to separate the core layer 220.

The groove 241 has a sloping surface 241A for converting an optical path by 90 degrees, and a sidewall surface 241B intersecting the sloping surface 241A. For example, the sidewall surface 241B is formed on a vertical surface perpendicular to the direction in which the optical waveguide 200 (or core layer 220) extends, and the sloping surface 241A is formed at a predetermined angle of 45 degrees, for example, with respect to the direction in which the optical waveguide 200 (or core layer 220) extends. In other words, the sloping surface 241A is formed at an inclination of 45 degrees with respect to a traveling direction of light propagating through the core layer 220. For this reason, the groove 241 may be formed to have a cross sectional shape that is an approximate right-angled triangular shape. The sloping surface 241A is provided closer to the opening 137x of the solder resist layer 137 than the sidewall surface 241B. The sidewall surface 241B does not necessarily have to be the vertical surface, and may be a surface that is slightly inclined toward the inside of the optical waveguide 200, for example. That is, the groove 241 may be formed to have a cross sectional shape that is an approximate V-shape.

Inside the groove 241, the metal film 251 is formed on the sloping surface 241A. The metal film 251 covers the core layer 220, at least at the sloping surface 241A. The metal film 251 may cover the first cladding layer 210 at the sloping surface 241A, in addition to covering the core layer 220 at the sloping surface 241A. The metal film 251 may have a thickness of approximately 0.2 μm to approximately 0.5 μm, for example. For example, Au, Ag, Al, or the like having an excellent light reflectivity may be used as the material forming the metal film 251. The metal film 251 is an example of an optical path conversion mirror.

The groove 242 has a sloping surface 242A for converting the optical path by 90 degrees, and a sidewall surface 242B intersecting the sloping surface 242A. For example, the sidewall surface 242B is formed on the vertical surface perpendicular to the direction in which the optical waveguide 200 (or core layer 220) extends, and the sloping surface 242A is formed at a predetermined angle of 45 degrees, for example, with respect to the direction in which the optical waveguide 200 (or core layer 220) extends. In other words, the sloping surface 242A is formed at an inclination of 45 degrees with respect to the traveling direction of the light propagating through the core layer 220. For this reason, the groove 242 may be formed to have a cross sectional shape that is an approximate right-angled triangular shape. The sidewall surface 242B is provided closer to the opening 137x of the solder resist layer 137 than the sloping surface 242A. The sidewall surface 242B does not necessarily have to be the vertical surface, and may be a surface that is slightly inclined toward the inside of the optical waveguide 200, for example. That is, the groove 242 may be formed to have a cross sectional shape that is an approximate V-shape.

Inside the groove 242, the metal film 252 is formed on the sloping surface 242A. The metal film 252 covers the core layer 220, at least at the sloping surface 242A. The metal film 252 may cover the first cladding layer 210 at the sloping surface 242A, in addition to covering the core layer 220 at the sloping surface 242A. The metal film 252 may have a thickness of approximately 0.2 μm to approximately 0.5 μm, for example. For example, Au, Ag, Al, or the like having an excellent light reflectivity may be used as the material forming the metal film 252.

The second cladding layer 230 is formed to fill the grooves 241 and 242, and to cover the metal films 251 and 252.

An opening 260, formed in the optical waveguide 200, exposes the upper surface of interconnect pattern 136A. Further, a conductive bonding member 160, made of a conductive bonding material, is provided on the interconnect pattern 136A that is exposed inside the opening 260. The conductive bonding member 160 may be a solder bump, for example. For example, an alloy containing Pb, an alloy of Sn and Cu, an alloy of Sn and Ag, an alloy of Sn, Ag and Cu, or the like may be used as the material forming the solder bump. The conductive bonding material used for the conductive bonding member 160 is an example of a first conductive bonding material.

The light emitting element 300 has a base 310, a light emitting portion 320, and a bump 330, and emits light toward the optical waveguide 200. The bump 330 is a Au bump, for example, and is electrically connected to the conductive bonding member 160 inside the opening 260. The conductive bonding member 160 mechanically fixes the bump 330 to the interconnect pattern 136A. The light emitting portion 320 is arranged at a position where the light can irradiate the surface of the metal film 251. For example, a vertical cavity surface emitting laser (VCSEL), a light emitting diode (LED), or the like may be used as the light emitting portion 320. The light emitting element 300 is an example of an optical element, and the bump 330 is an example of a second electrode.

An underfill resin 340, through which the light emitted from the light emitting portion 320 of the light emitting element can be transmitted, is filled between the optical waveguide 200 and the light emitting element 300. The underfill resin 340 protects a light emitting surface of the light emitting portion 320.

The fixing member 600 fixes the light emitting element 300 to the optical waveguide 200. The fixing member 600 is made of a resin, such as a potting resin or the like, for example. A softening point of the fixing member 600 is higher than a melting point of the conductive bonding member 160. For example, the melting point of the conductive bonding member 160 is approximately 150° C. to approximately 240° C., and the softening point of the fixing member 600 is 250° C. or higher. The fixing member 600 is preferably provided at least on both ends of the light emitting element 300 along the Y-direction. In this case, the fixing member 600 can fix both ends of the light emitting element 300 to the optical waveguide 200 along the Y-direction. Further, the fixing member 600 is preferably provided at the end of the light emitting element 300 along the X-direction, on the side separated from the metal film 251. In this case, the fixing member 600 can fix the end of the light emitting element 300 along the X-direction, on the side separated from the metal film 251, to the optical waveguide 200. The fixing member 600 may be provided at a plurality of mutually separated positions, or may be integrally provided in a continuous manner.

The light emitted from the light emitting portion 320 is transmitted through the underfill resin 340 and the second cladding layer 230, reflected by the metal film 251, and directed (or guided) toward the core layer 220. This light propagates inside the core layer 220, reflected by the metal film 252, and directed (or guided) toward the optical component 400.

The optical component 400 has a lens (not illustrated) in a path of the light reflected by the surface of the metal film 252. The light passing through the lens is guided to an optical fiber (not illustrated), for example, and is transmitted through the optical fiber. The optical component 400 is provided on the wiring board 100, so as to cover a portion of the optical waveguide 200.

The electronic circuit chip 500 has a body 510 including a driving circuit (or driver) that drives the light emitting element 300, and a plurality of external electrodes 520 electrically connected to the driving circuit. Each of the plurality of external electrodes 520 is electrically connected to the interconnect layer 136 of the wiring board 100, via the conductive bonding member 170. The plurality of external electrodes 520 include an external electrode 520A bonded to the interconnect pattern 136A via the conductive bonding member 170A. The external electrode 520A is electrically connected to the bump 330 of the light emitting element 300, via the conductive bonding member 170A, the interconnect pattern 136A, and the conductive bonding member 160. The external electrode 520A is an example of a third electrode. The melting point of the conductive bonding member 170 is lower than the softening point of the fixing member 600. The melting point of the conductive bonding member 170 is approximately 150° C. to approximately 240° C., for example.

The electronic circuit chip 500 is formed to be thicker than the light emitting element 300. In addition, the optical component 400 is formed to be thicker than the electronic circuit chip 500.

[Method of Manufacturing Optical Module]

Next, a method of manufacturing the optical module 1 according to one embodiment will be described. FIG. 3 through FIG. 10 are cross sectional views illustrating the method of manufacturing the optical module 1 according to one embodiment.

First, the wiring board 100 is prepared, as illustrated in FIG. 3. For example, the wiring board 100 may be made using a known build-up technique.

Next, the first cladding layer 210 and the core layer 220 are formed, as also illustrated in FIG. 3. The first cladding layer 210 may be formed by coating a liquid or paste resin material on the upper surface of the insulating layer 135, followed by ultraviolet irradiation and heating, to cure the liquid or paste resin material, for example. Alternatively, instead of coating the liquid or paste resin material, a film of the resin material may be laminated on the insulating layer 135. The material forming the first cladding layer 210 and the thickness of the first cladding layer 210, are as described above. The core layer 220 may be formed by coating a liquid or paste resin material on the entire upper surface of the first cladding layer 210, followed by ultraviolet irradiation and heating, to cure the liquid or paste resin material, and then pattern the cured resin material by photolithography, for example. Alternatively, instead of coating the liquid or paste resin material, a film of the resin material may be laminated on the first cladding layer 210. The material forming the core layer 220 and the thickness of the core layer 220, are as described above.

Figure 4:
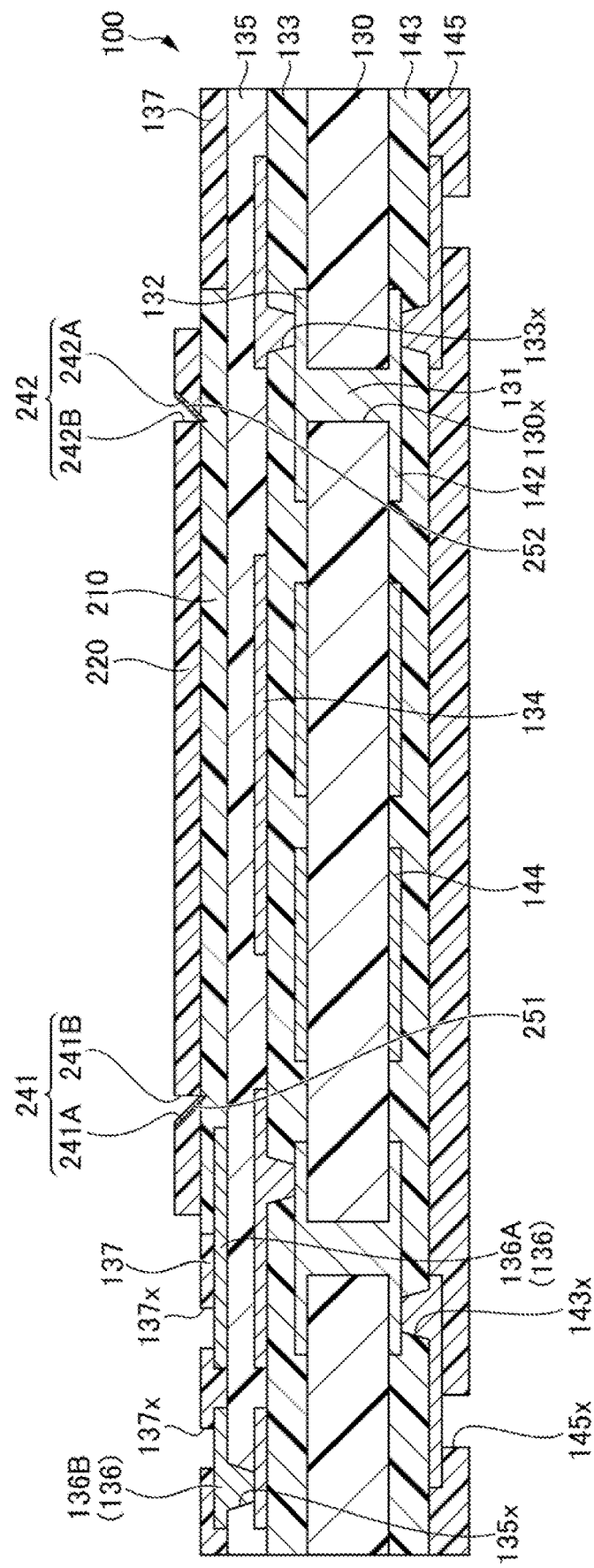
FIG. 4 is a cross sectional view (part 2) illustrating the method of manufacturing the optical module according to one embodiment.

Thereafter, the grooves 241 and 242 are formed, as illustrated in FIG. 4. The grooves 241 and 242 may be formed using a rotating blade (not illustrated) of a cutting apparatus, for example. Alternatively, the grooves 241 and 242 may be formed by laser beam irradiation.

Next, the metal film 251 is formed on the sloping surface 241A of the groove 241, and the metal film 252 is formed on the sloping surface 242A of the groove 242, as also illustrated in FIG. 4. The metal films 251 and 252 may be formed by deposition, sputtering, or the like, for example.

Figure 5:
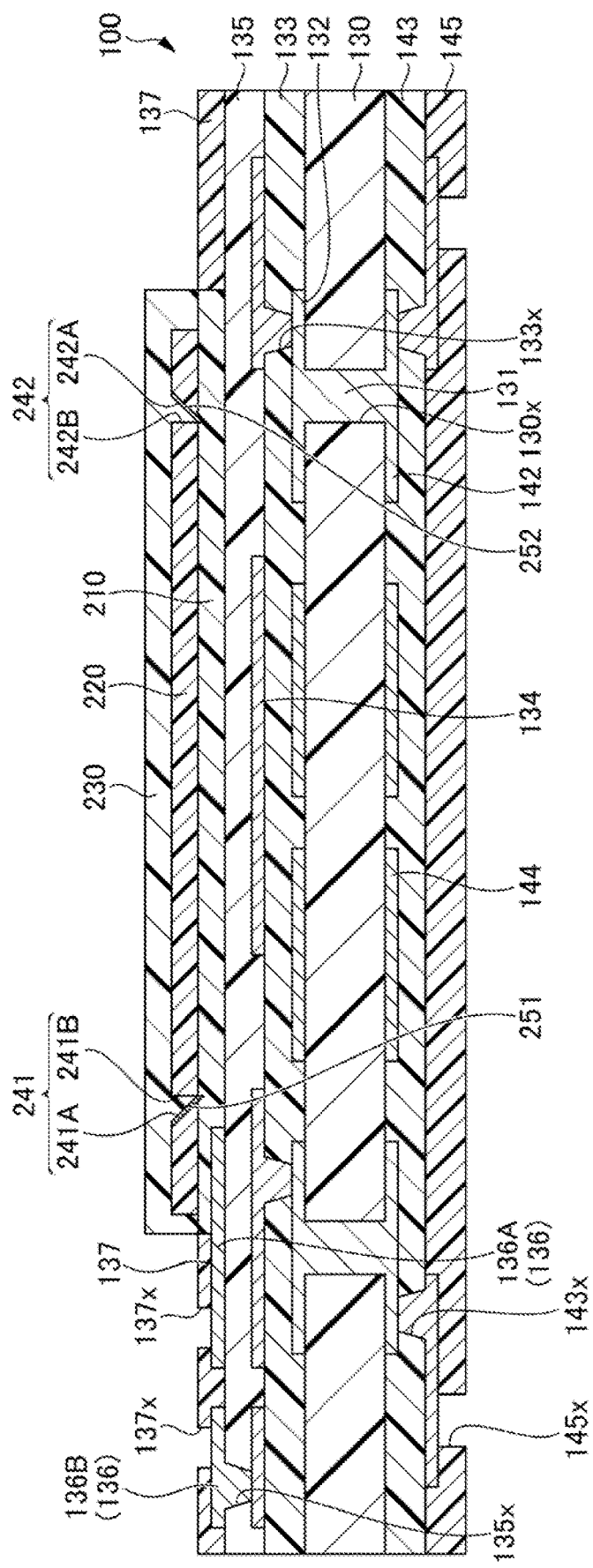
FIG. 5 is a cross sectional view (part 3) illustrating the method of manufacturing the optical module according to one embodiment.

Next, the second cladding layer 230 is formed by filling the grooves 241 and 242, so as to cover the metal films 251 and 252, as illustrated in FIG. 5. Accordingly, the periphery of the core layer 220 is covered by the first cladding layer 210 and the second cladding layer 230. The second cladding layer 230 may be formed by a method similar to forming the first cladding layer 210. The material forming the second cladding layer 230 and the thickness of the second cladding layer 230, are as described above.

Figure 6:
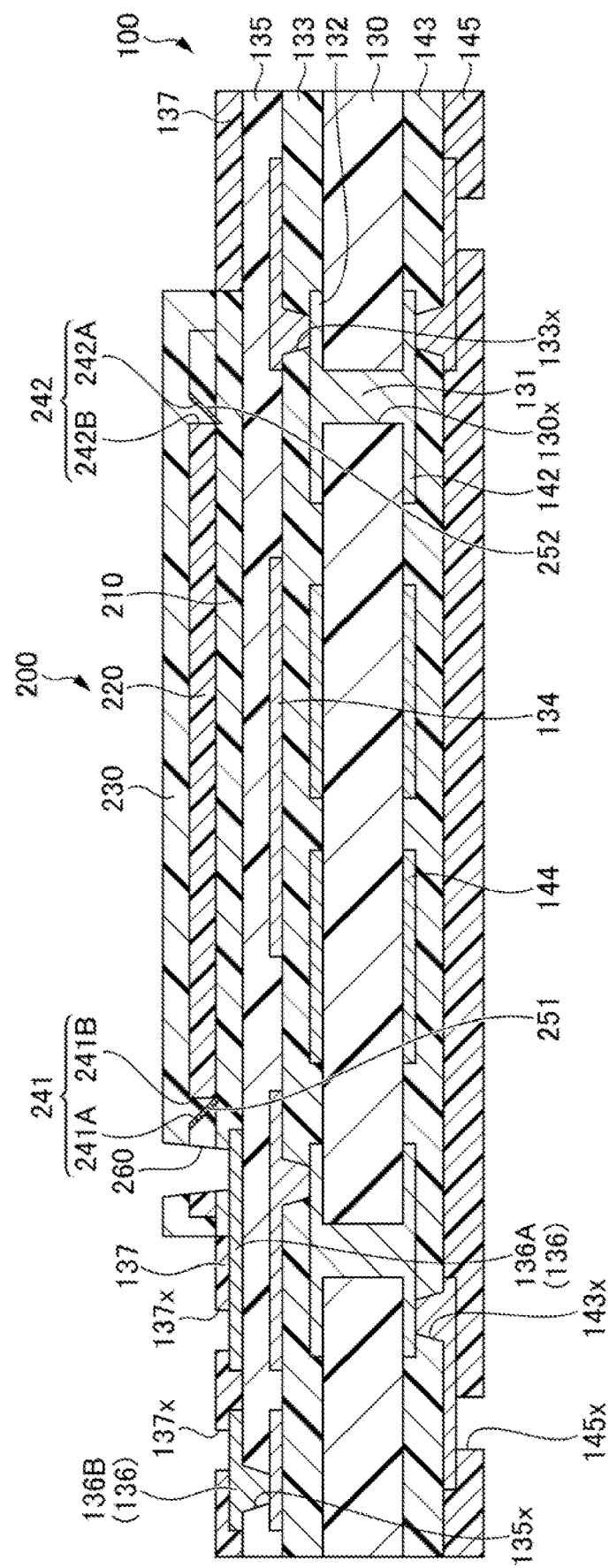
FIG. 6 is a cross sectional view (part 4) illustrating the method of manufacturing the optical module according to one embodiment.

Thereafter, the opening 260 is formed in the optical waveguide 200, as illustrated in FIG. 6. The opening 260 may be formed by laser machining using a $CO_2$ laser, for example. As a result, the upper surface of the interconnect pattern 136A is exposed inside the opening 260.

Figure 7:
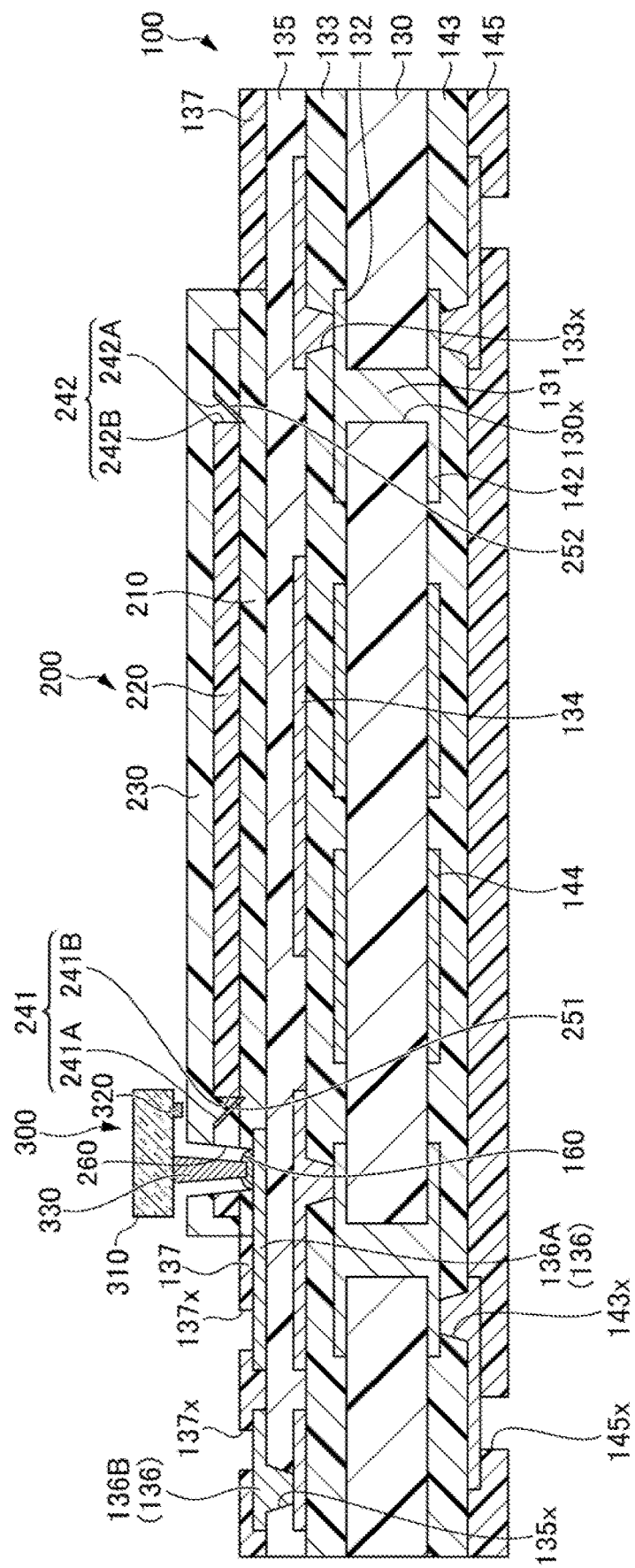
FIG. 7 is a cross sectional view (part 5) illustrating the method of manufacturing the optical module according to one embodiment.

Next, the light emitting element 300 is mounted on the optical waveguide 200, as illustrated in FIG. 7. When mounting the light emitting element 300, the conductive bonding member 160 is provided on the upper surface of the interconnect pattern 136A exposed inside the opening 260. In addition, a chip mounter device having a suction head and a heater, for example, is used hold the light emitting element 300 by the suction head. In this state, the light emitting element 300 is held by the suction head in a state where the bump 330 faces downward. Further, the heater is turned on, to heat the light emitting element 300 including bump 330, via the suction head. In this state, the temperature of the bump 330 is set higher than the melting point of the conductive bonding member 160. The bump 330 is then inserted into the opening 260, to make contact with the conductive bonding member 160. As a result, the conductive bonding member 160 begins to melt. The light emitting element 300 is aligned with respect to the optical waveguide 200 in the melted state of the conductive bonding member 160, and when the alignment is completed, the heater is turned off. As a result, the conductive bonding member 160 begins to solidify. Upon completion of solidification of the conductive bonding member 160, the light emitting element 300 is released from the suction head. Accordingly, the light emitting element 300 is fixed to the interconnect pattern 136A by the conductive bonding member 160, in the state where the position of the light emitting element 300 is aligned with respect to the optical waveguide 200. When the light emitting element 300 is mounted on the optical waveguide 200, the heating may be performed from a stage (not illustrated) on which the wiring board 100 is placed or set.

Figure 8:
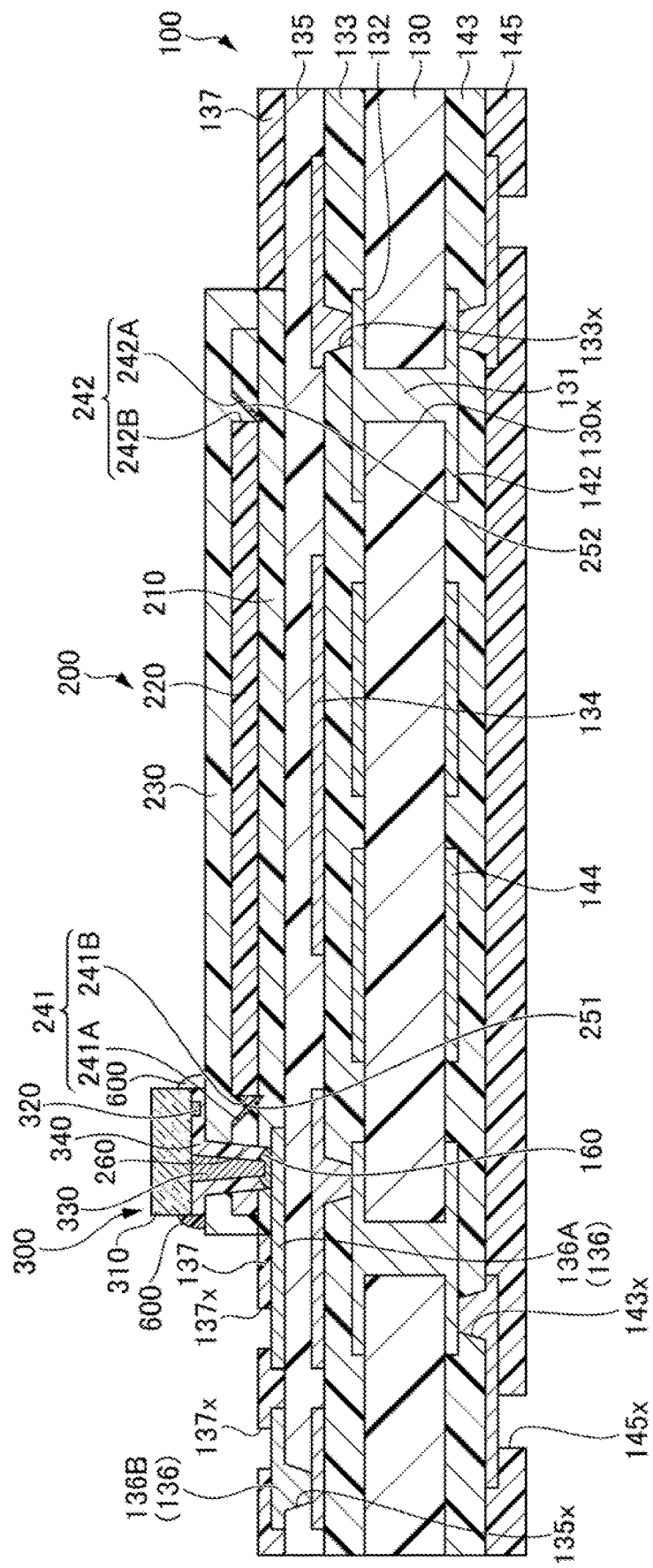
FIG. 8 is a cross sectional view (part 6) illustrating the method of manufacturing the optical module according to one embodiment.

Next, the fixing member 600 is formed, as illustrated in FIG. 8. When forming the fixing member 600, an uncured resin is coated to make contact with a side surface of the light emitting element 300 and an upper surface of the optical waveguide 200, and cured by heating, for example. The resin used for the fixing member 600 has a curing temperature lower than the melting point of the conductive bonding member 160, and a softening point after the curing higher than the melting point of the conductive bonding member 160. By curing the resin at a temperature lower than the melting point of the conductive bonding member 160 to change the state of the fixing member 600, it is possible to prevent misalignment and tilt of the light emitting element 300 caused by the melting of the conductive bonding member 160 when the resin cures. For example, a potting resin may be used as the resin forming the fixing member 600. The resin used for the fixing member 600 may be an epoxy resin, for example. Alternatively, the resin used for the fixing member 600 may be an acrylic resin or a silicone resin, for example.

Next, the underfill resin 340 is filled between the optical waveguide 200 and the light emitting element 300, as also illustrated in FIG. 8. The underfill resin 340 is made of a material through which the light emitted from the light emitting portion 320 of the light emitting element 300 can be transmitted. The underfill resin 340 may be an epoxy resin, for example.

Figure 9:
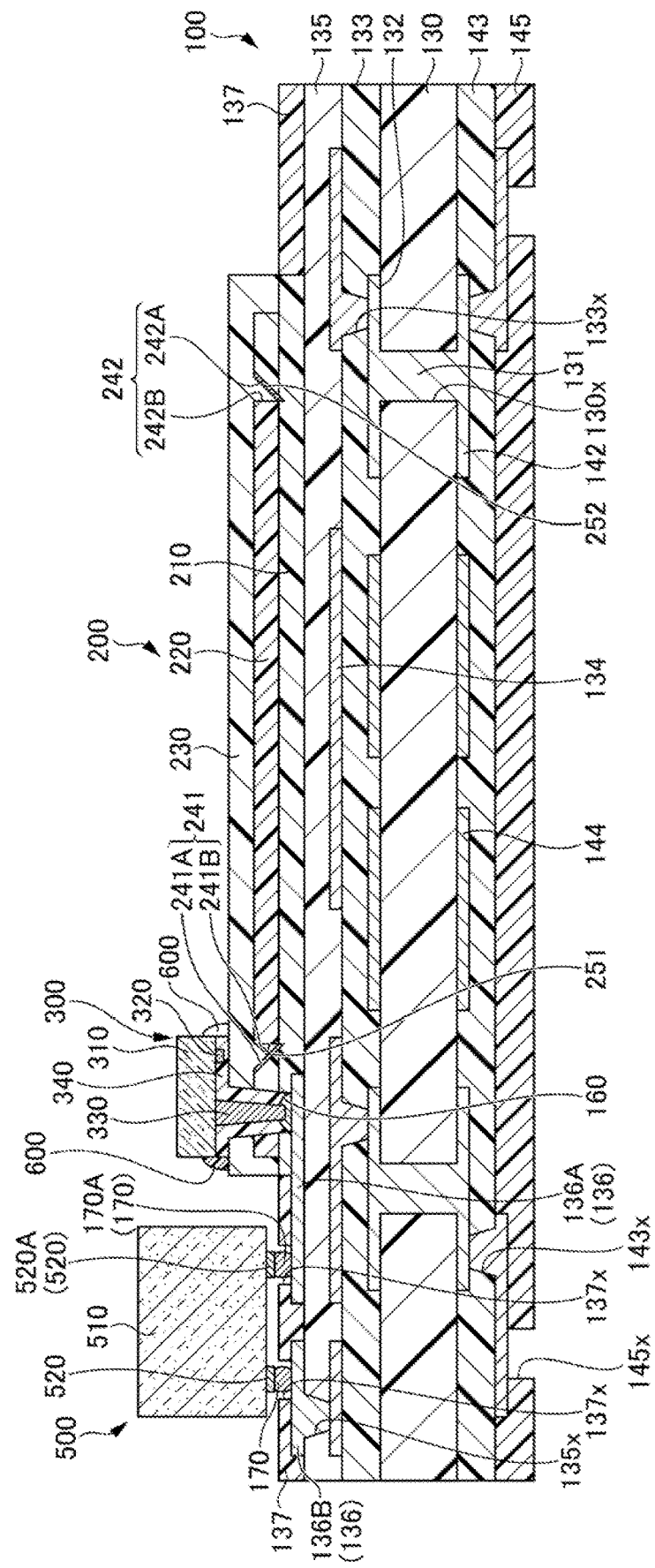
FIG. 9 is a cross sectional view (part 7) illustrating the method of manufacturing the optical module according to one embodiment.

Next, the electronic circuit chip 500 is mounted on the wiring board 100, as illustrated in FIG. 9. When mounting the electronic circuit chip 500, the conductive bonding member 170 is provided on the upper surface of the interconnect layer 136 exposed via the opening 137x. In addition, the electronic circuit chip 500 is mounted on the wiring board 100, so that the external electrodes 520 make contact with the conductive bonding member 170. The wiring board 100 may be placed or set using the chip mounter device having the suction head. After placing or setting the wiring board 100, the conductive bonding member 170 is melted and solidified by a reflow soldering. The conductive bonding member 170 that is used has a melting point lower than the softening point of the fixing member 600. The conductive bonding material used for the conductive bonding member 170 may be the same as the conductive bonding material used for the conductive bonding member 160. By performing the reflow soldering at a temperature lower than the softening point of the fixing member 600, it is possible to maintain the light emitting element 300 in a state fixed to the optical waveguide 200 by the fixing member 600. For this reason, even if the conductive bonding member 160 melts or the underfill resin 340 softens during the reflow soldering, the misalignment and tilt of light emitting element 300 can be prevented.

Figure 10:
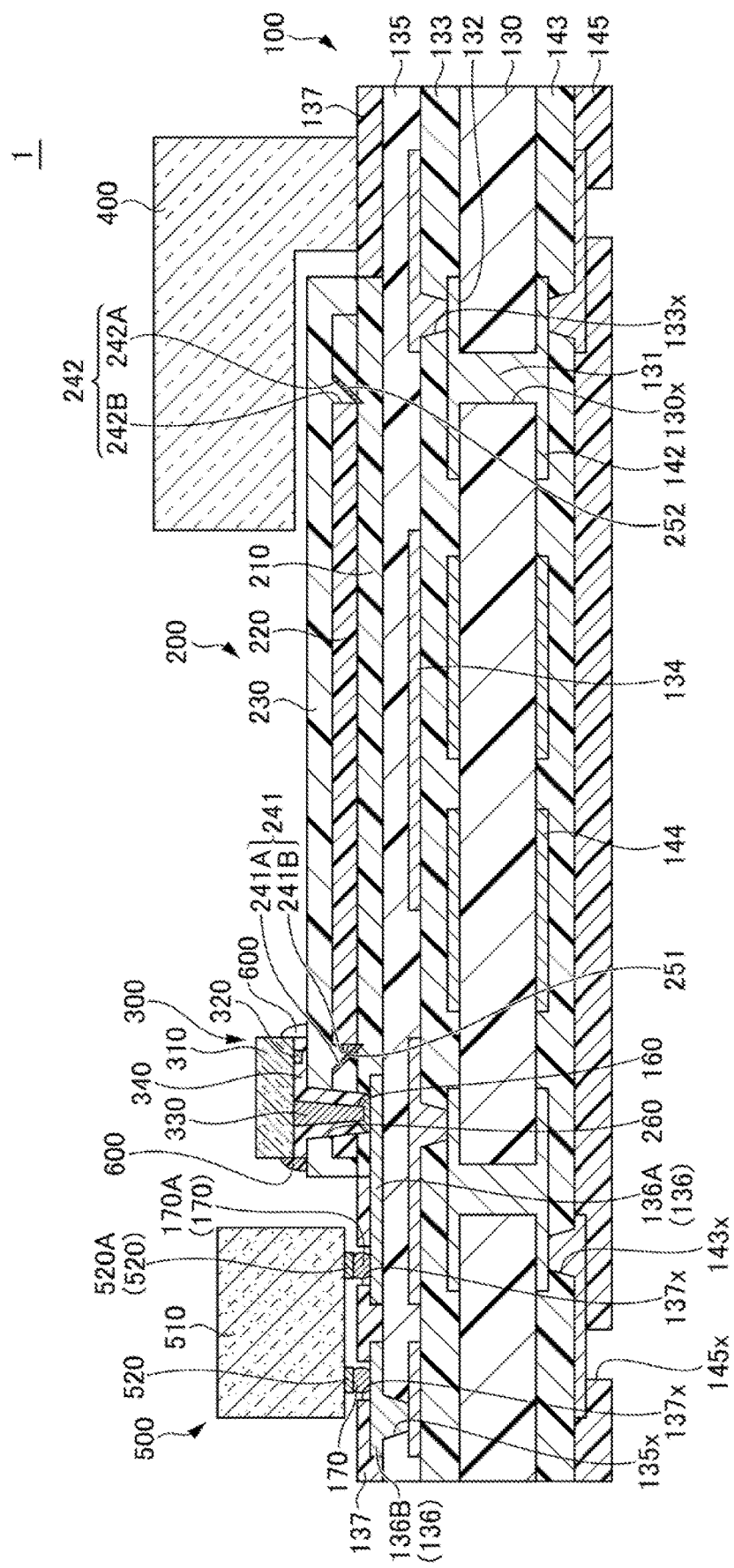
FIG. 10 is a cross sectional view (part 8) illustrating the method of manufacturing the optical module according to one embodiment.

Thereafter, the optical component 400 is mounted on the wiring board 100, as illustrated in FIG. 10.

In the optical module 1 according to one embodiment, since the softening point of the fixing member 600 is higher than the melting point of the conductive bonding members 160 and 170, it is possible to prevent the misalignment and tilt of the light emitting element 300 even if the conductive bonding member 160 melts when the electronic circuit chip 500 is mounted. Accordingly, it is possible to reduce the loss of the optical signal caused by the misalignment or tilt of the light emitting element 300. In addition, since the curing temperature of the resin used for the fixing member 600 is lower than the melting point of the conductive bonding member 160, the resin is cured at a temperature lower than the melting point of the conductive bonding member 160, and it is possible to prevent the misalignment or tilt of the light emitting element 300 caused by the melting of the conductive bonding member 160 when the resin is cured.

Moreover, the electronic circuit chip 500 is thicker than the light emitting element 300. For this reason, when the electronic circuit chip 500 is mounted before the light emitting element 300, a range in which the suction head can move when mounting the light emitting element 300 becomes limited by the electronic circuit chip 500. Similarly, when the optical component 400 is mounted before the electronic circuit chip 500, the range in which the suction head can move when mounting the electronic circuit chip 500 becomes limited by the optical component 400. In this embodiment, since the light emitting element 300 is mounted before the electronic circuit chip 500, and the electronic circuit chip 500 is mounted before the optical component 400, it is possible to reduce the limits to the range in which the suction head can move.

The underfill resin 340 may be omitted, as appropriate.

In addition, a light receiving element, such as a photodiode or the like, may be used in place of the light emitting element 300. In this case, a chip of the TIA may be used as the electronic circuit chip 500. In this example, the metal films 251 and 252, which are an example of the optical path conversion mirror, may be formed in the second cladding layer 230.

Next, various modifications of the embodiment will be described. The arrangement of the fixing member of these modifications differs from that of the above described embodiment. FIG. 11A through FIG. 11D are plan views illustrating the arrangement of the fixing member in the modifications.

Figure 11A:
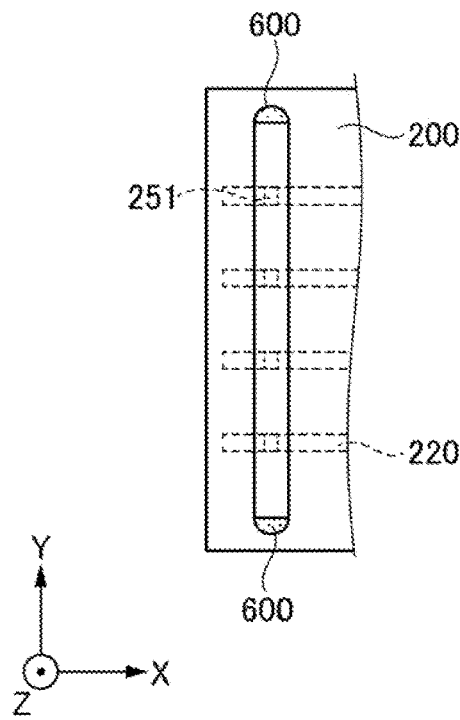
FIG. 11A, FIG. 11B, FIG. 11C, and FIG. 11D are plan views illustrating an arrangement of a fixing member in modifications of the embodiment.

In a first modification illustrated in FIG. 11A, a fixing member 600, in the plan view, is provided so as to make contact with both side surface portions of the light emitting element 300 along the Y-direction, and the fixing member 600 is not in contact with side surface portions of the light emitting element 300 along the X-direction.

Figure 11B:
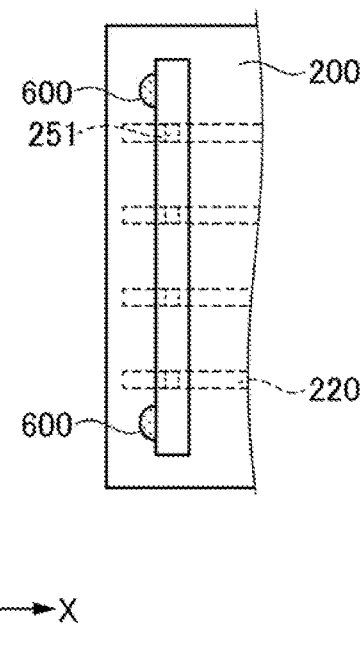

In a second modification illustrated in FIG. 11B, a fixing member 600, in the plan view, is provided so as to make contact with a first side surface portion (left side surface portion in this example) of the light emitting element 300 along the X-direction at two positions, where the first side surface portion is separated more from the optical component 400 than a second side surface portion (right side surface portion in this example) of the light emitting element 300. Further, in the plan view, the fixing member 600 does not make contact with the side surface portions of the light emitting element 300 along the Y-direction, nor the second side surface portion of the light emitting element 300 along the X-direction. In the plan view, the fixing member 600 is arranged at the two positions sandwiching all of the core layers 220 along the Y-direction.

Figure 11C:
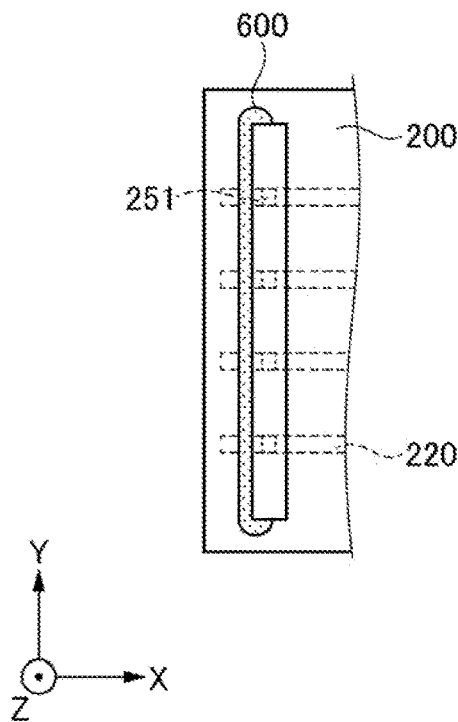

In a third modification illustrated in FIG. 11C, a fixing member 600, in the plan view, is provided so as to make contact with the entirety of the first side surface portion (left side surface portion in this example) of the light emitting element 300 along the X-direction, where the first side surface portion is separated more from the optical component 400 than the second side surface portion (right side surface portion in this example) of the light emitting element 300. Further, in the plan view, the fixing member 600 does not make contact with the second side surface portion of the light emitting element 300 along the X-direction.

Figure 11D:
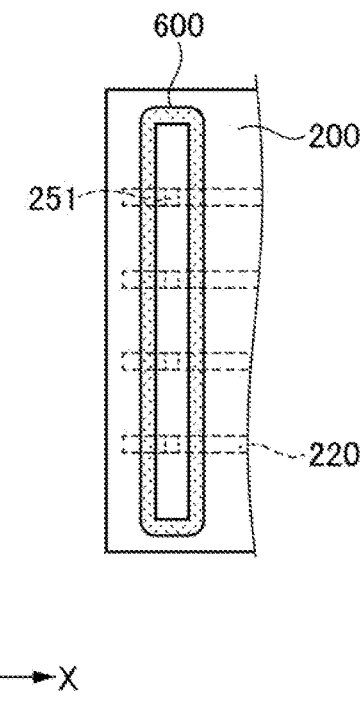

In a fourth modification illustrated in FIG. 11D, the fixing member 600, in the plan view, is provided so as to make contact with the entire side surface of the light emitting element 300.

The fixing member 600, in the plan view, may be provided so as to overlap the portion of the core layer 220 where the light propagates, as in the case of the fourth modification. But preferably, the fixing member 600, in the plan view, is provided so as not to overlap the portion of the core layer 220 where the light propagates, in order to avoid damage or the like caused by a collision with a dispenser that is used when forming the fixing member 600.

Although the preferred embodiments and modifications have been described in detail above, various variations, modifications, and substitutions may be made to the embodiments and modifications described above without departing from the scope of the present disclosure.

Accordingly to each of the embodiments and modifications described above, it is possible to provide an optical module and a method for manufacturing the optical module, which can reduce the loss of the optical signal.

Various aspects of the subject-matter described herein may be set out non-exhaustively in the following numbered clauses:

1. A method of manufacturing an optical module, comprising:
   providing an optical waveguide on a wiring board having a first electrode;
   providing an optical element having a second electrode, on the optical waveguide, and bonding the second electrode to the first electrode via a first conductive bonding material; and
   forming a fixing member configured to fix the optical element to the optical waveguide,
   wherein the optical waveguide includes a core layer, a first cladding layer provided on a first side of the core layer closer to the wiring board, a second cladding layer provided on a second side of the core layer opposite to the first side, and an optical path conversion mirror provided on the core layer or the second cladding layer,
   wherein the optical element is optically coupled to one end of the core layer via the optical path conversion mirror,
   wherein a softening point of the fixing member is higher than a melting point of the first conductive bonding material, and
   wherein the forming the fixing member includes
      coating an uncured resin, and
      curing the uncured resin at a temperature lower than the melting point of the first conductive bonding material, to form the fixing member.
2. The method of manufacturing the optical module according to clause 1, wherein a solder is used as the first conductive bonding material.
3. The method of manufacturing the optical module according to clause 1 or 2, further comprising:
   placing an electronic circuit chip having a third electrode, on the wiring board, to sandwich a second conductive bonding material between the first electrode and the third electrode; and
   bonding the third electrode to the first electrode via the second conductive bonding material, by performing a reflow soldering at a temperature higher than a melting point of the second conductive bonding material and lower than the softening point of the fixing member.
4. The method of manufacturing the optical module according to clause 3, wherein a solder is used as the second conductive bonding material.

Although the modifications are numbered with, for example, "first," "second," "third," or "fourth," the ordinal numbers do not imply priorities of the modifications. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
   a wiring board having a first electrode;
   an optical waveguide provided on the wiring board;
   an optical element having a second electrode and provided on the optical waveguide;
   a first conductive bonding member, made of a first conductive bonding material, and configured to bond the second electrode to the first electrode;
   an optically transparent underfill resin, filled between the optical waveguide and the optical element, and configured to guide light output from or input to the optical element; and
   a fixing member, separate from the underfill resin, configured to fix the optical element to the optical waveguide,
   wherein the optical waveguide includes a core layer, a first cladding layer provided on a first side of the core layer closer to the wiring board, a second cladding layer provided on a second side of the core layer opposite to the first side, and an optical path conversion mirror provided on the core layer or the second cladding layer,
   wherein the optical element is optically coupled to one end of the core layer via the optical path conversion mirror, and
   wherein a softening point of the fixing member is higher than a melting point of the first conductive bonding material and higher than a melting point of the underfill resin.

2. The optical module as claimed in claim 1, wherein the first conductive bonding material is a solder.

3. The optical module as claimed in claim 1, further comprising:
   an electronic circuit chip having a third electrode and provided on the wiring board; and
   a second conductive bonding member, made of a second conductive bonding material, and configured to bond the third electrode to the first electrode,
   wherein the softening point of the fixing member is higher than a melting point of the second conductive bonding material.

4. The optical module as claimed in claim 3, wherein the second conductive bonding material is a solder.

5. The optical module as claimed in claim 3, wherein the fixing member is made of a potting resin.

6. The optical module as claimed in claim 3, wherein the fixing member, in a plan view, fixes at least both ends of the optical element, along a first direction perpendicular to a second direction in which the core layer extends, to the optical waveguide.

7. The optical module as claimed in claim 6, wherein the fixing member, in the plan view, fixes the end of the optical element, separated from the optical path conversion mirror along the second direction, to the optical waveguide.

8. The optical module as claimed in claim 3, wherein
   the optical waveguide includes an opening penetrating the first cladding layer, the core layer, and the second cladding layer in a thickness direction thereof, and
   the second electrode is bonded to the first electrode via the first conductive bonding member inside the opening.

9. The optical module as claimed in claim 3, wherein
the optical path conversion mirror is provided on the core layer,
the optical element includes a light emitting portion configured to emit light, and
the light emitting portion overlaps the optical path conversion mirror in a plan view, via the underfill resin and the second cladding layer.

10. The optical module as claimed in claim 1, wherein the fixing member is made of a potting resin.

11. The optical module as claimed in claim 1, wherein the fixing member, in a plan view, fixes at least both ends of the optical element, along a first direction perpendicular to a second direction in which the core layer extends, to the optical waveguide.

12. The optical module as claimed in claim 11, wherein the fixing member, in the plan view, fixes the end of the optical element, separated from the optical path conversion mirror along the second direction, to the optical waveguide.

13. The optical module as claimed in claim 1, wherein
the optical waveguide includes an opening penetrating the first cladding layer, the core layer, and the second cladding layer in a thickness direction thereof, and
the second electrode is bonded to the first electrode via the first conductive bonding member inside the opening.

14. The optical module as claimed in claim 1, wherein
the optical path conversion mirror is provided on the core layer,
the optical element includes a light emitting portion configured to emit light, and
the light emitting portion overlaps the optical path conversion mirror in a plan view, via the underfill resin and the second cladding layer.

* * * * *